United States Patent
Mackle et al.

(10) Patent No.: US 7,758,996 B2
(45) Date of Patent: Jul. 20, 2010

(54) BATTERY LATCHING ASSEMBLY

(75) Inventors: Blair Michael Mackle, Christchurch (NZ); David John Mason, Christchurch (NZ)

(73) Assignee: Tait Electronics Limited, Christchurch (NZ)

( * ) Notice: Subject to any disclaimer, the term of this patent is extended or adjusted under 35 U.S.C. 154(b) by 421 days.

(21) Appl. No.: 11/572,700

(22) PCT Filed: Aug. 2, 2005

(86) PCT No.: PCT/NZ2005/000194

§ 371 (c)(1),
(2), (4) Date: Jan. 25, 2007

(87) PCT Pub. No.: WO2006/014112

PCT Pub. Date: Feb. 9, 2006

(65) Prior Publication Data

US 2008/0268329 A1    Oct. 30, 2008

(30) Foreign Application Priority Data

Aug. 2, 2004   (NZ) ...................................... 534475

(51) Int. Cl.
*H01M 2/10* (2006.01)
(52) U.S. Cl. ............................. 429/97; 429/96; 361/814
(58) Field of Classification Search ........................ None
See application file for complete search history.

(56) References Cited

U.S. PATENT DOCUMENTS

| | | |
|---|---|---|
| 4,904,549 A | 2/1990 | Goodwin et al. |
| 5,213,913 A | 5/1993 | Anthony, III et al. |
| 5,664,292 A * | 9/1997 | Chen ........................... 24/3.11 |
| 5,869,204 A | 2/1999 | Kottke et al. |
| 5,895,729 A | 4/1999 | Phelps, III et al. |
| 6,136,467 A | 10/2000 | Phelps, III et al. |
| 6,225,777 B1 | 5/2001 | Garcia et al. |
| 6,623,049 B2 | 9/2003 | Shreeve et al. |
| 6,660,427 B1 | 12/2003 | Hukill et al. |
| 2003/0003949 A1* | 1/2003 | Park ........................... 455/550 |
| 2003/0152825 A1 | 8/2003 | Siddiqui et al. |
| 2004/0001997 A1* | 1/2004 | Zatezalo et al. ............... 429/96 |
| 2004/0192106 A1 | 9/2004 | Britz |

FOREIGN PATENT DOCUMENTS

| | | |
|---|---|---|
| EP | 1463275 A1 | 9/2004 |
| WO | WO 95/05683 | 2/1995 |

* cited by examiner

*Primary Examiner*—Dah-Wei D Yuan
*Assistant Examiner*—Katherine Turner
(74) *Attorney, Agent, or Firm*—Hovey Williams LLP (57) ABSTRACT

A latching assembly for securing a battery package (12) to a portable communication device. The latching assembly includes a pair of opposed moveable latches (10), each latch (10) being located toward a side of the battery package, and a biasing member or members (13) arranged to bias the latches (10) away from each other to engage with respective catches on the portable communication device to thereby secure the battery package (12) to the portable communication device. User contacts (15) are also provided and these are operable to cause the latches (10) to move toward each other to disengage from their respective catches to enable the battery package (12) to be removed from the portable communication device.

27 Claims, 11 Drawing Sheets

BATTERY LATCHING ASSEMBLY

FIELD OF THE INVENTION

The present invention relates to a latching assembly for securing a battery to a portable communication device.

BACKGROUND TO THE INVENTION

Portable communication devices, such as two-way radios, portable telephones, mobile phones and the like, generally have a removable battery package which supplies power. Typically the removable battery packages are secured to the portable communication device by a latching assembly.

Generally, latching assemblies comprise parts located on both the portable communication device and the battery package which lock together to secure the battery package to the portable communication device. Commonly, a latching assembly includes a central movable latching member located at the top of the battery package, which is configured to engage in a catch provided on the portable communication device. To remove the battery package, a user may push the moveable latch member to disengage it from the catch. Examples of these and other latching assemblies are described in U.S. Pat. Nos. 5,869,204, 5,895,729, 6,623,049, 6,660,427, 6,136,467, and 6,225,777.

It is an object of the present invention to provide an improved latching assembly for securing a battery package to a portable communication device, or to at least provide the public with a useful choice.

SUMMARY OF THE INVENTION

In a first aspect, the present invention broadly consists in a latching assembly for securing a battery package to a portable communication device, comprising: a pair of opposed moveable latches, each latch being located toward a side of the battery package; a biasing member or members arranged to bias the latches away from each other to engage with respective catches on the portable communication device to thereby secure the battery package to the portable communication device; and user contacts that are operable to cause the latches to move toward each other to disengage from their respective catches to enable the battery package to be removed from the portable communication device.

In one form of the latching assembly, the latches are latching members, each latching member having a contacting portion that forms a user contact and a latching portion for engaging with a respective catch on the portable communication device. Preferably, the contacting portions of the latching members are operable to move toward each other to thereby disengage the latching portions of the latching members from their respective catches to enable the battery package to be released from the portable communication device.

The latching members may be arranged to sit in elongate guides provided in the battery package, the latching members and guides cooperating to allow the latching members to slide toward or away from each other. Preferably, the biasing member or members are arranged to urge the latching members to slide away from each other such that their latching portions engage with respective catches on the portable communication device to thereby secure the battery package to the portable communication device. More preferably, the contacting portions of the latching members are operable to slide the latching members toward each other to disengage the latching portions from their respective catches to thereby release the battery package from the portable communication device.

Preferably, each latching member has a side body that is arranged to move within a cavity in the battery package as the latching members move toward and away from each other in operation. More preferably, each latching member has an associated biasing member that has first and second ends, the first end being securely received and retained by the side body of each latching member, while the second end is arranged to abut a surface within the cavity of the battery package in which the side body moves. Alternatively, there may be a single biasing member connected between the latching members via the cavity, the biasing member having two ends that are securely received and retained by the respective side bodies of the latching members.

Preferably, the contacting portions of the latching members are shaped to form finger undercuts to enable a user to grip and operate the contacting portions to release the battery package from the portable communication device.

Preferably, the latching portions of the latching members are shaped to engage with the catches of the portable communication device in a locking relationship. More preferably, the latching portions of the latching members are arranged to engage with the catches of the portable communication device by hooking substantially under the catches.

In another form of the latching assembly, the user contacts are separate moveable contacting parts that are arranged to engage with respective latches, the contacting parts being operable by a user to move toward each other to cause the latches to also move toward each other and thereby disengage from their respective catches to enable the battery package to be released from the portable communication device.

Preferably, the latches and contacting parts are slidably mounted to the battery package, each latch and contacting part being moveable back and forth along a straight pathway. More preferably, the pathways of movement for each latch and respective contacting part are parallel or coincident. Alternatively, each latch may be arranged to slide back and forth along a pathway that is at an angle with respect to the pathway along which its respective contacting part travels. Preferably, each contacting part and respective latch has an angled contacting surface, the surfaces being arranged to engage against each other and slide across one another as the contacting part causes movement of the latch.

Preferably, the or each biasing member is a coiled spring. Alternatively, the or each biasing member may be a resilient springy metal member or any other type of biasing members or mechanisms may be utilised.

In a second aspect, the present invention broadly consists in a removable battery package for a portable communication device, comprising: a casing having front and rear faces, top and bottom ends, and sides; a pair of opposed moveable latches, each latch being located toward a side of the casing; a biasing member or members arranged to bias the latches away from each other to engage with respective catches on the portable communication device to thereby secure the battery package to the portable communication device; and user contacts that are operable to cause the latches to move toward each other to disengage from their respective catches to enable the battery package to be removed from the portable communication device.

In one form of the removable battery package, the latches are latching members, each latching member having a contacting portion that forms a user contact and a latching portion for engaging with a respective catch on the portable communication device. Preferably, the contacting portions of the latching members are operable to move toward each other to thereby disengage the latching portions of the latching members from their respective catches to enable the battery package to be released from the portable communication device.

The latching members may be arranged to sit in elongate guides provided toward the top end of the casing, the latching members and guides cooperating to allow the latching members to slide toward or away from each other. Preferably, the biasing member or members are arranged to urge the latching members to slide away from each other such that their latching portions engage with respective catches on the portable communication device to thereby secure the battery package to the portable communication device. More preferably, the contacting portions of the latching members are operable to slide the latching members toward each other to disengage the latching portions from their respective catches to thereby release the battery package from the portable communication device.

Preferably, each latching member has a side body that is arranged to move within a cavity centrally located toward the top end of the casing as the latching members move toward and away from each other in operation. More preferably, each latching member has an associated biasing member that has first and second ends, the first end being securely received and retained by the side body of each latching member, while the second end is arranged to abut a surface within the cavity of the battery package in which the side body moves.

Preferably, the contacting portions of the latching members are shaped to form finger undercuts to enable a user to grip and operate the contacting portions to release the battery package from the portable communication device.

Preferably, the latching portions of the latching members are shaped to engage with the catches of the portable communication device in a locking relationship. More preferably the latching portions of the latching members are arranged to engage with the catches of the portable communication device by hooking substantially under the catches.

Preferably, the contacting portions of the latching members are exposed at the front face of the casing, while the latching portions of the latching members are exposed at the rear face of the casing.

In another form of the removable battery package, the user contacts are separate moveable contacting parts that are arranged to engage with respective latches, the contacting parts being operable by a user to move toward each other to cause the latches to also move toward each other and thereby disengage from their respective catches to enable the battery package to be released from the portable communication device. Preferably, the latches and contacting parts are slidably mounted toward the top end of the casing, each latch and contacting part being moveable back and forth along a straight pathway. More preferably, the pathways of movement for each latch and respective contacting part are parallel or coincident. Alternatively, each latch may be arranged to slide back and forth along a pathway that is at an angle with respect to the pathway along which its respective contacting part travels. Preferably, each contacting part and respective latch has an angled contacting surface, the surfaces being arranged to engage against each other and slide across one another as the contacting part causes movement of the latch.

Preferably, a belt clip assembly is provided on the front face of the casing toward the top end between the latching members.

Preferably, the or each biasing member is fully enclosed by a portion of the casing.

Preferably, the or each biasing member is a coiled spring. Alternatively, the or each biasing member may be a resilient springy metal member or any other type of biasing members or mechanisms may be utilised.

In a third aspect, the present invention broadly consists in a latching assembly for securing a battery package to a portable communication device, comprising: a pair of opposed moveable latches, each latch being located toward a side of the battery package; a biasing member or members arranged to cause the latches to engage with respective catches on the portable communication device to thereby secure the battery package to the portable communication device; and user contacts that are operable to cause the latches to disengage from their respective catches to enable the battery package to be removed from the portable communication device.

In one form of the latching assembly, the latches are latching members, each latching member having a contacting portion that forms a user contact and a latching portion for engaging with a respective catch on the portable communication device. Preferably, the latching members are slidably mounted to the battery package and the or each biasing member is arranged to urge the latching members to slide away from each other so that the latching portions of the latching members engage with their respective catches on the portable communication device to thereby secure the battery package to the portable communication device. More preferably, the contacting portions of the latching members are operable to cause the latching members to slide toward each other to thereby disengage the latching portions of the latching members from their respective catches to enable the battery package to be released from the portable communication device.

In another form of the latching assembly, the user contacts are separate moveable contacting parts that are arranged to engage with respective latches. Preferably, the or each biasing member is arranged to urge the latches away from each other and into engagement with their respective catches on the portable communication device, the contacting parts being operable by a user to move toward each other to cause the latches to also move toward each other and thereby disengage from their respective catches to enable the battery package to be released from the portable communication device. More preferably, the latches and contacting parts are slidably mounted to the battery package, each latch and contacting part being moveable back and forth along a straight pathway.

In another form of the latching assembly, the latching members are pivotally mounted to the battery package, the pivot point for each latching member being located between its contacting and latching portions. Preferably, each latching member has an associated biasing member that is arranged to urge the latching portion of each latching member to pivot into engagement with its respective catch on the portable communication device. More preferably, the contacting portions of the latching members are operable to move toward each other to thereby pivot the latching portions of each latching member away from their respective catches to thereby release the battery package from the portable communication device.

Preferably, the or each biasing member is a coiled spring. Alternatively, the or each biasing member may be a resilient springy metal member or any other type of biasing members or mechanisms may be utilised.

In this specification and the accompanying claims, the phrase "battery package" is intended to cover any form of battery that delivers electrical energy, whether rechargeable or not, regardless of the number of electrically connected electrochemical cells it has or the way in which they are packaged, housed or cased.

The term 'comprising' as used in this specification and claims means 'consisting at least in part of', that is to say when interpreting statements in this specification and claims which include that term, the features, prefaced by that term in each statement, all need to be present but other features can also be present.

The invention consists in the foregoing and also envisages constructions of which the following gives examples only.

BRIEF DESCRIPTION OF THE DRAWINGS

Preferred embodiments of the invention will be described by way of example only and with reference to the drawings, in which.

DETAILED DESCRIPTION OF PREFERRED EMBODIMENTS

Figure 1:
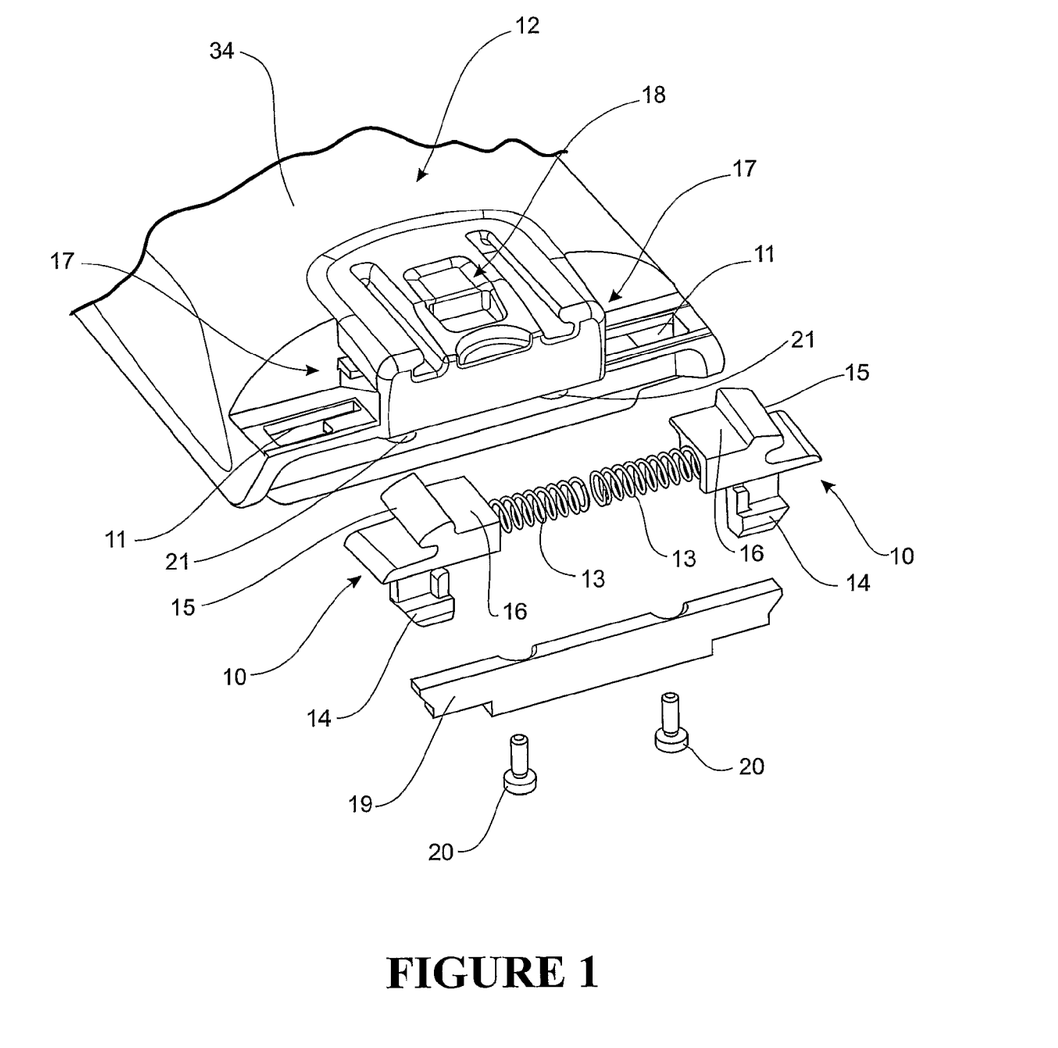
FIG. 1 is an exploded top perspective view of a preferred form latching assembly removed from its battery package.
Figure 2:
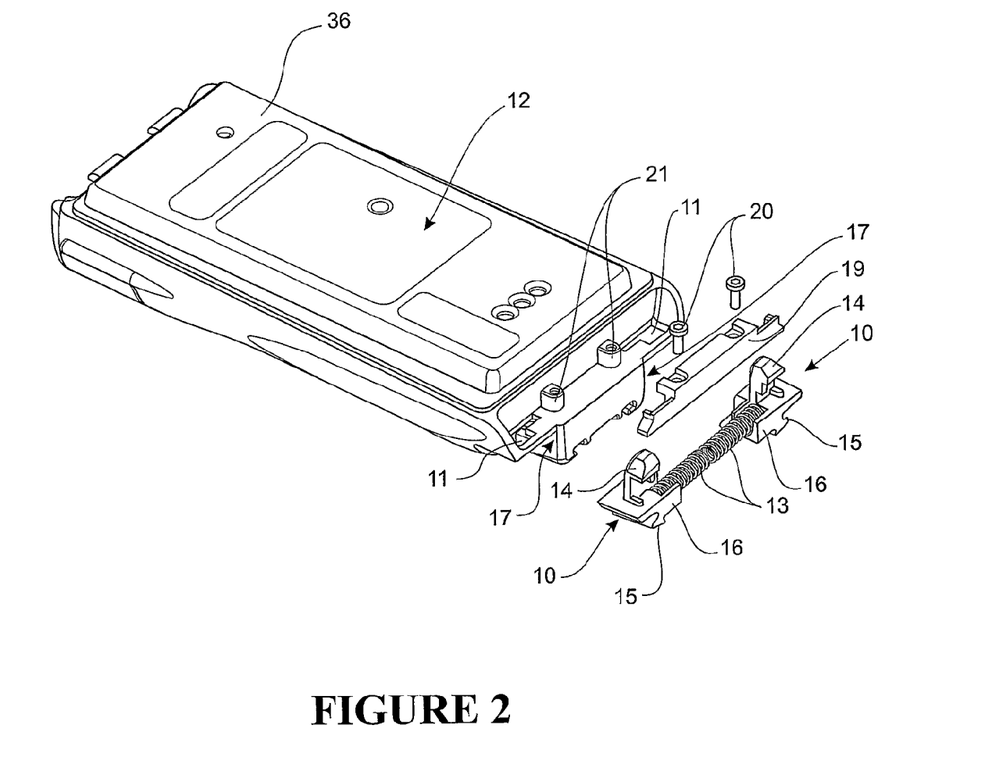
FIG. 2 is an exploded bottom perspective view of the preferred form latching assembly removed from its battery package.

Referring to FIGS. 1 and 2, the preferred form latching assembly includes a pair of opposed moveable latches 10. In the preferred form, the latches are in the form of latching members 10 that are configured to sit in respective guides 11 provided at the side of each top corner of a battery package 12, the battery package having front 34 and rear 36 faces. The latching members 10 are configured to slidably move toward and away from each other along the guides 11 during operation and are biased away from each other by springs 13. When the battery package 12 is secured to a portable communication device, such as a two-way radio, portable telephone, mobile phone or the like, the latching members 10 are biased away from each other by the springs 13 so that latching portions 14 of the latching members 10 engage with catches on the portable communication device. In order to release the battery package 12 from a portable communication device, a user must squeeze or pinch user contacting portions 15 of the latching members 10 toward each other, for example with a finger and thumb, to disengage the latching portions 14 from the catches of the portable communication device.

Integral with the latching portion 14 and contacting portion 15 of each latch member 10 is a side body 16 which is configured to operatively slide within a respective cavity 17 formed by a central top end portion of the battery package 12, which may for example be a belt clip attachment assembly 18. In order to retain the latching members 10 within their respective guides 11, a bracket 19 is provided which is fixable to the top end of the battery package 12 via fastening members 20, for example screws, bolts or the like, which engage with respective apertures 21 formed in the casing of the battery package 12.

The side bodies 16 of each latch member 10 are also configured to securely receive and retain an end of the biasing springs 13, while the other end of each spring 13 is configured to abut a surface dividing the cavities 17 of the battery package 12. Therefore, when the latching assembly is fitted to the battery package 12 as shown in FIG. 3, the springs 13 are completely enclosed and protected.

Figure 3:
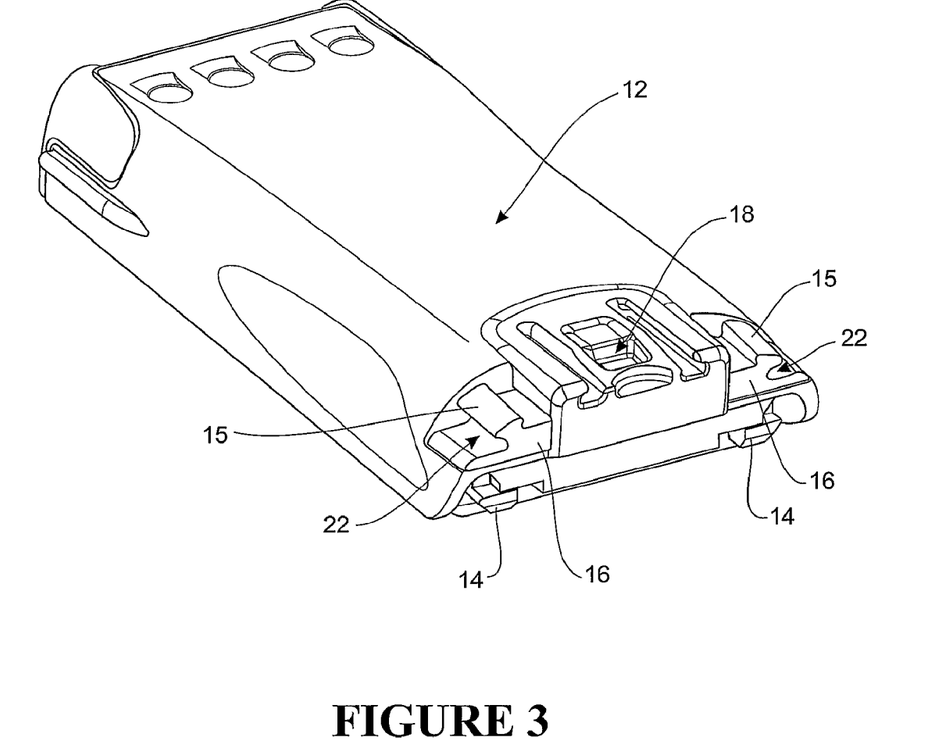
FIG. 3 is a top perspective view of a preferred form battery package fitted with the preferred form latching assembly.

Referring to FIG. 3, the preferred form contacting portions 15 of the latching members 10 are provided with lower recesses 22 which form finger undercuts to enable users to more easily squeeze or pinch the latching members 10 together when releasing the battery package 12 from a portable communication device.

Figure 4:
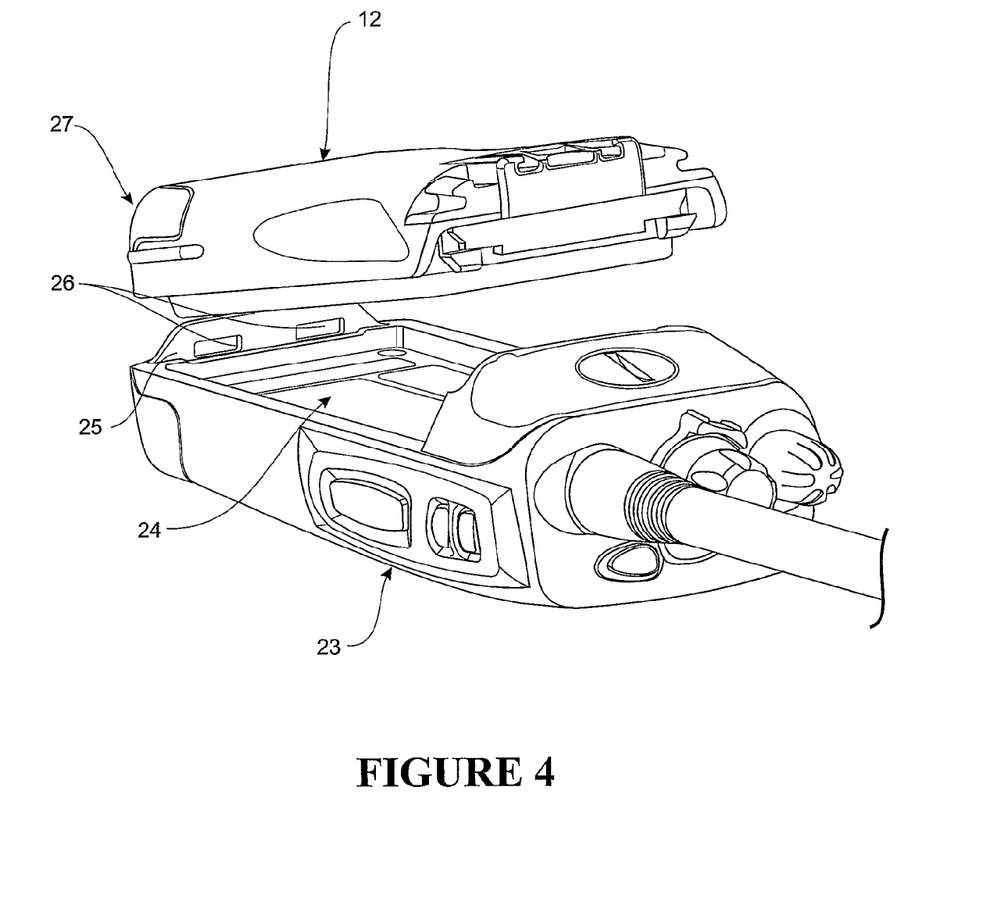
FIG. 4 is a perspective view of a preferred form battery package and latching assembly prior to being secured to a radio.
Figure 5:
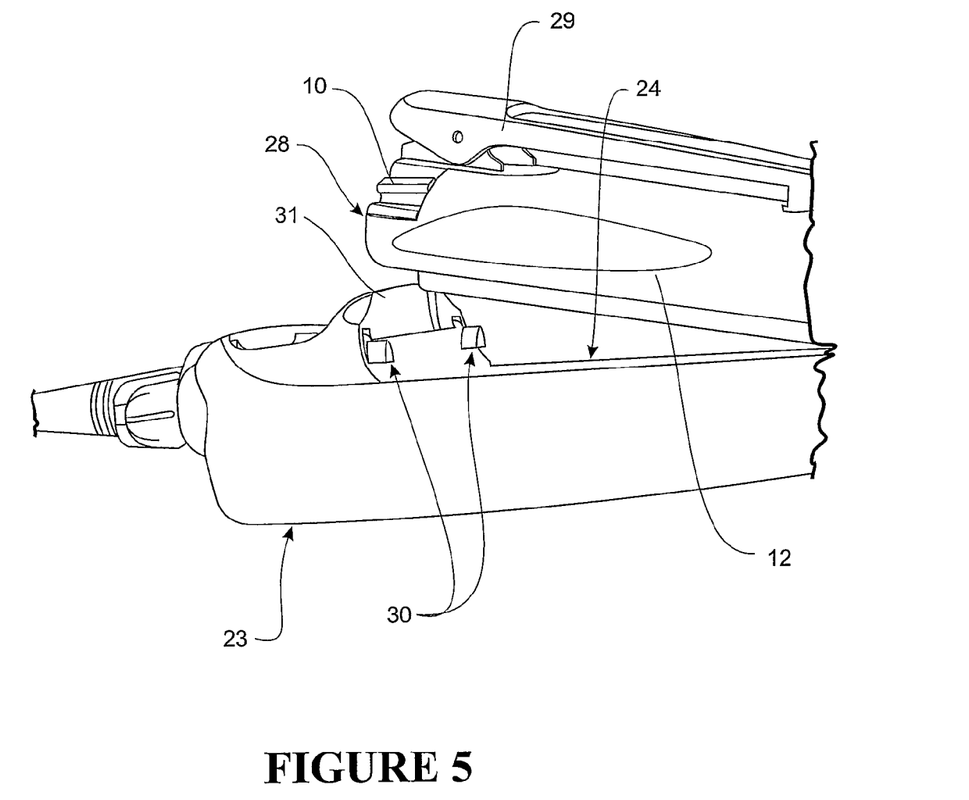
FIGS. 5 and 6 are perspective views of the preferred form battery package, with a belt clip, partially secured to a radio.

The attachment of a battery package 12, fitted with a preferred form latching assembly, to a portable two-way radio will now be described. Referring to FIG. 4, the battery package 12 when fitted essentially forms a rear portion of the housing of the radio 23 and is received partially within a compartment 24 provided by the housing of the radio 23. The compartment 24 of the radio 23 includes a back wall 25 having elongate apertures 26 which are configured to receive and retain corresponding protrusions extending from the end of the battery package 12. When fitting the battery package 12 to the radio 23, the bottom end 27 of the battery package is lowered into the compartment 24 so that its protrusions engage with the elongate apertures of the back wall 25 of the compartment 24. Referring to FIG. 5, the top end 28 of the battery package 12, fitted with the latching members 10 and a belt clip 29, is then lowered or pivoted into the compartment 24 in order to engage the latching members 10 with respective catches 30 formed in the front wall 31 of the compartment 24 to secure the battery package 12 in place.

Figure 6:
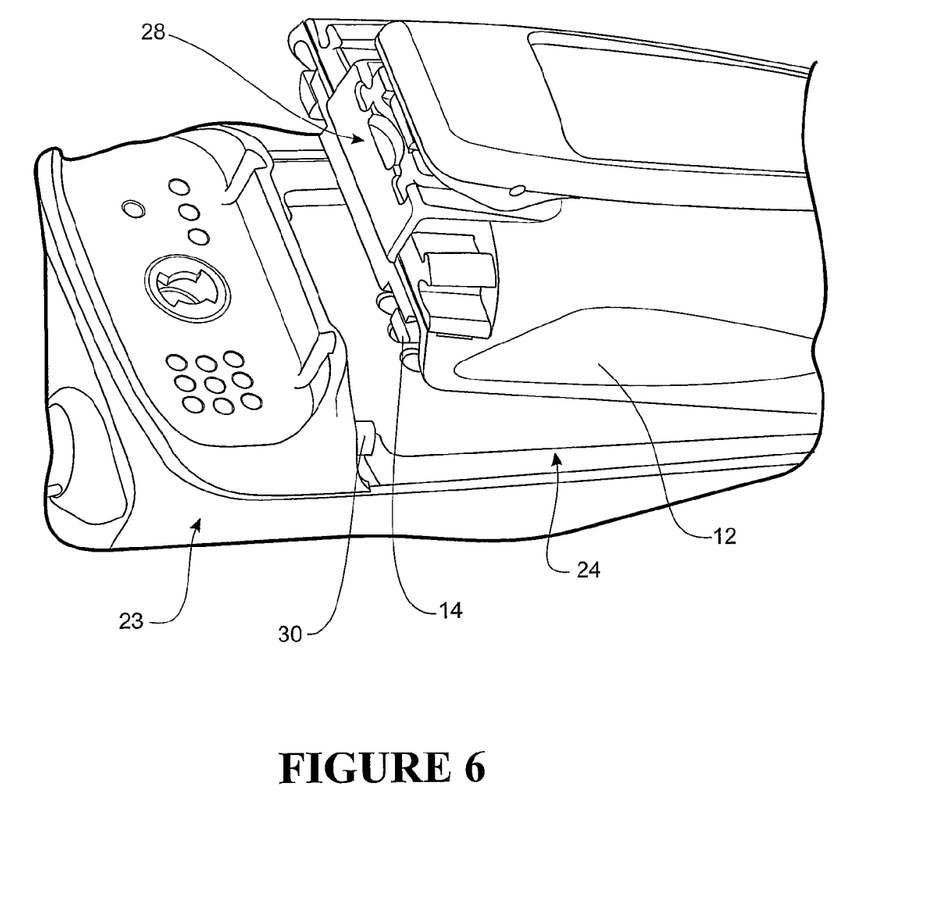
Figure 7:
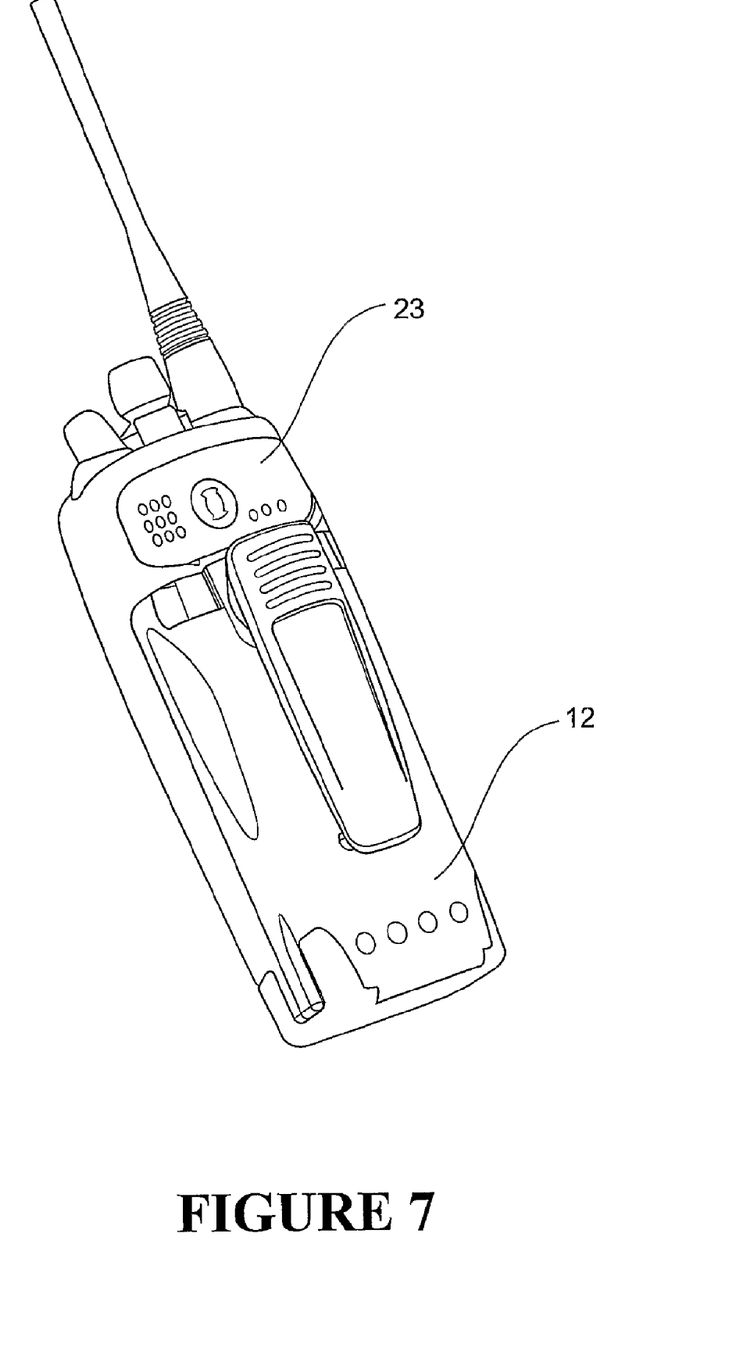
FIGS. 7 and 8 are perspective views of preferred form battery packages, with and without belt clips respectively, fully secured to radios by the latching assembly.
Figure 8:
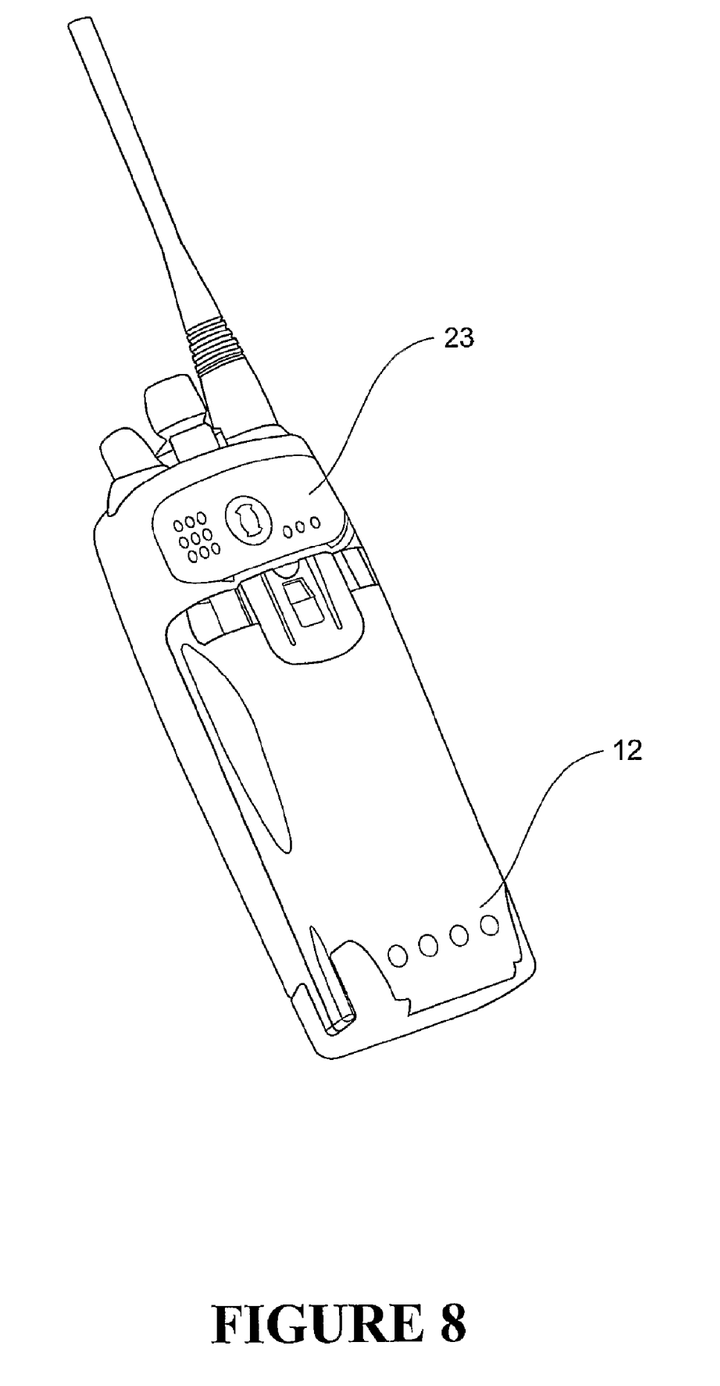

Referring to FIG. 6, as the top end 28 is lowered into the compartment 24 of the radio 23, the latching portions 14 of each of the latching members 10 abut the catches 30 of the compartment 24 and are forced inwardly toward each other until they are able to spring outwardly to hook under the catches 30 when the battery package 12 is fully engaged with the radio 23. Once the latching portions 14 of the latching members 10 are engaged with or hooked under their respective catches 30, the battery package 12 will remain secured to the radio 23, as shown in FIGS. 7 and 8, due to the springs biasing the latching members 10 outwardly. To release the battery package 12 from the radio 23, a user is required to manually squeeze or pinch the latching members 10 together via their contacting portions 15 to thereby disengage the latching portions 14 of the latching members 10 from under their respective catches 30.

The latching assembly securely attaches the battery package 12 and radio 23 together and ensures that the battery package 12 cannot be accidentally or inadvertently removed from the radio 23 if it is knocked, dropped or inserted into a leather case. Furthermore, the latching assembly is easy and intuitive to operate for a user and generates a loud click when the battery package 12 is fully engaged with the radio 23 to notify the user that the battery package 12 is securely attached.

It is generally desirable to attach removable belt clips as high above the center of gravity of the radio 23 and battery package 12 as possible to ensure appropriate balance when they are belt worn. A benefit of the latching assembly in this respect is that the latching members 10 are located on each top side of the battery package 12, thereby enabling a removable belt clip to be attached between them at the top end of the battery package 12. Therefore, with the latching assembly a removable belt clip may be located as high up the battery package 12 as desired to reduce the radio 23 and battery package 12 from swinging when belt worn.

It will be appreciated that the latching assembly may be configured to secure battery packages to other portable communication devices, such as portable telephones, mobile phones or the like.

It will be appreciated that there are various alternative implementations of the preferred form latching assembly described above. For example, resilient springy metal members or any other type of biasing members or mechanisms could be utilised instead of springs 13 to bias the latching members 10. Further, a single biasing spring, member or mechanism could be utilised to bias both latching members in alternative forms of the latching mechanism. For example, a single biasing spring connecting the two latching members through a single cavity in the housing of the battery package could be utilised in an alternative arrangement.

The preferred form battery latching assembly described with reference to FIGS. 1-8 utilises latches that are in the form of latching members 10 that have latching portions 14 for engaging with respective catches 30 on the radio 23 and user contacting portions 15 for operation by a user to unlock the latching assembly to remove the battery package 12 from the radio 23. It will be appreciated that the latches do not have to have integral latching and user contacting portions. The latches may be operatively connected to separate user contacting parts in alternative forms of the latching assembly.

Figure 9:
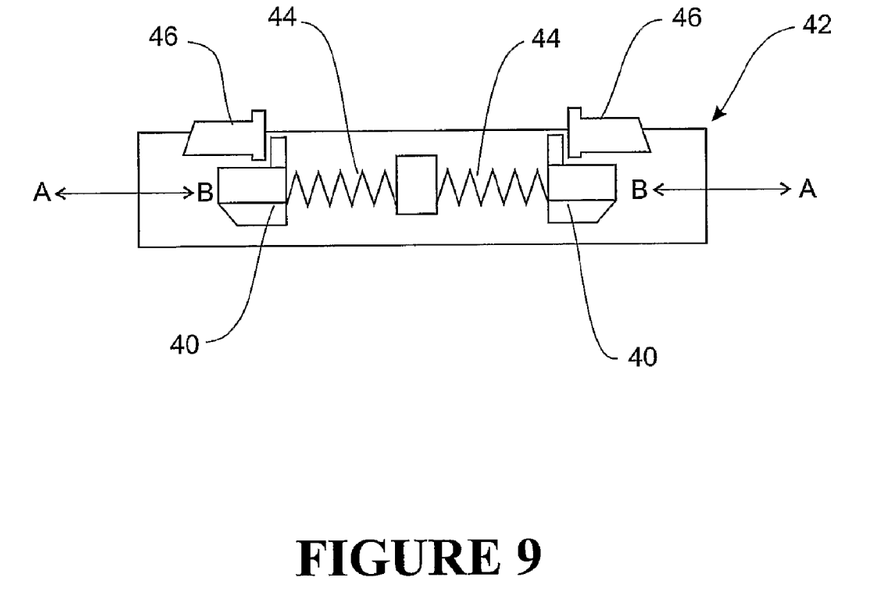
FIG. 9 is a schematic end view of a battery package having an alternative form of latching assembly.

By way of example, FIG. 9 shows an alternative latching assembly that comprises moveable latches 40 for engaging with respective catches on the radio. As with the preferred form latching assembly of FIGS. 1-8, the latches 40 are slidably mounted to enable back and forth movement relative to the housing 42 of the battery package as indicated by arrows A and B. Further, the latches 40 are biased outwardly relative to each other by biasing springs 44 to automatically engage with respective catches of the radio to lock the battery package to the radio. As before, the latches 40 are shaped with latching portions that engage in a locking relationship with the respective catches, but they do not have integral user contacting portions. Rather, separate moveable user contacting parts 46 are provided that engage with the latches 40 to provide an operable connection. Like the latches 40, the contacting parts 46 are arranged to slide back and forth relative to the housing 42 of the battery package as indicated by arrows A and B. In operation, the contacting parts 46 may be squeezed or pinched toward each other, for example with a finger and thumb, to disengage or unlock the latches 40 from their respective catches to enable the battery package to be removed from the radio. In particular, the movement of contacting parts 46 toward each other in direction B causes a corresponding movement of the latches 40, thereby causing them to disengage or unlock from their respective catches.

Figure 10:
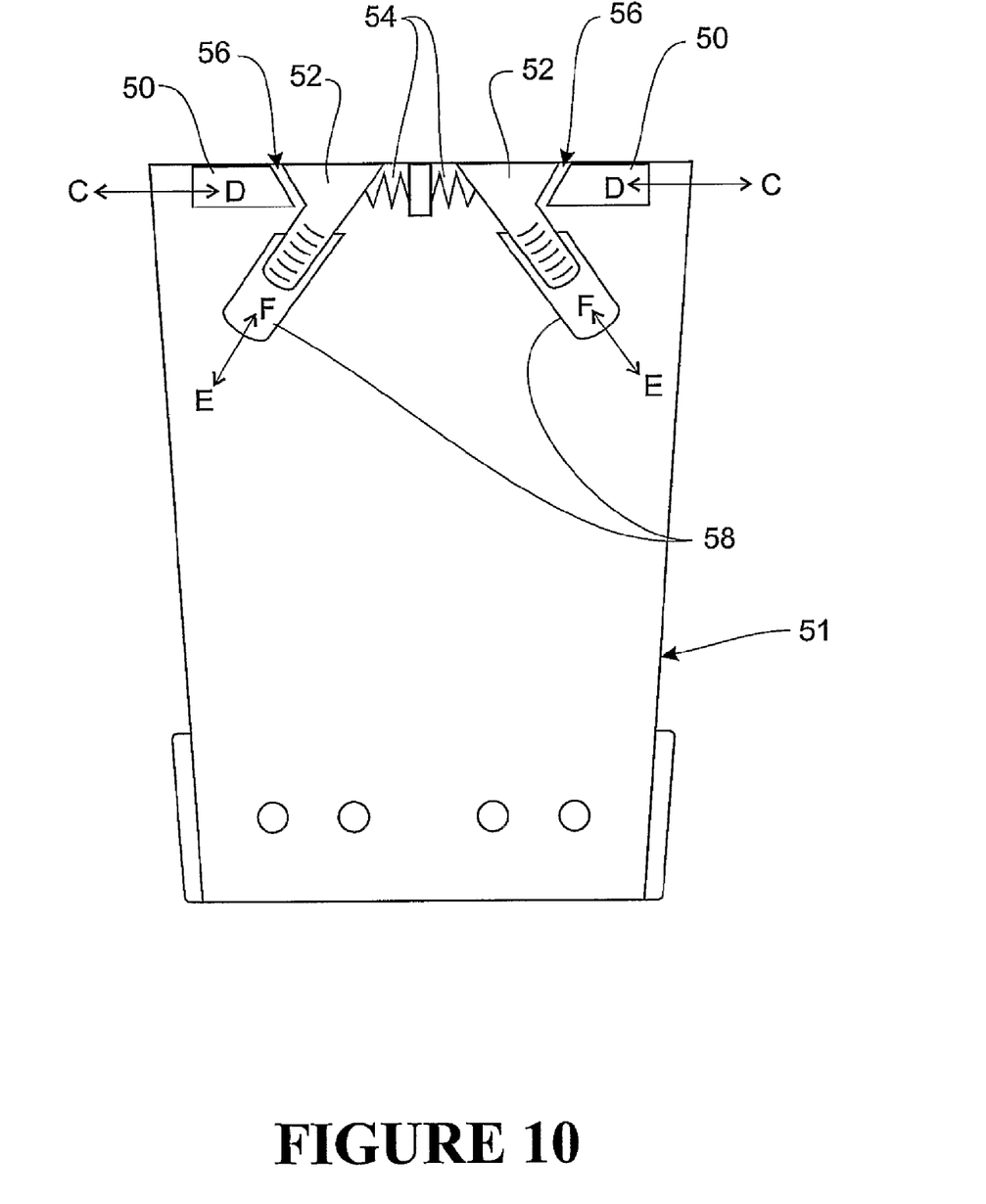
FIG. 10 is a schematic plan view of a battery package having another alternative form of latching assembly.

It will be appreciated that the latches 40 and their respective contacting parts 46 of the latching assembly arrangement of FIG. 9 do not necessarily have to move or slide along coincident or parallel pathways. By way of example, FIG. 10 shows an alternative latching assembly in which the latches 50 are arranged to move back and forth along pathway CD relative to the housing 51 of the battery package, while user contacting parts 52 are arranged to slide back and forth along pathway EF relative to the housing 51. Latches 50 are shown schematically as blocks, but it will be appreciated that they are shaped with latching portions that engage with respective catches on the radio. In this alternative arrangement, biasing springs 54 urge the contacting parts 52 outwardly relative to each other such that they are urged to slide or move within their guides 58 in direction E. The latches 50 and contacting parts 52 are provided with cooperating angled faces or surfaces 56 that operatively engage with each other. As the contacting parts 52 move in direction E, the angled surfaces 56 engage with each other and slide relative to each other to cause the latches 50 to move in direction C and engage with their respective catches on the radio to secure the battery package to the radio. To release the battery package, the contacting parts 52 may be squeezed or pinched toward each other, for example with a finger and thumb, to thereby cause the contacting parts 52 to move toward each other in direction F. As the contacting parts 52 come together, the latches 50 may disengage from their respective catches to release the battery package from the radio. This alternative arrangement is one example that demonstrates how the contacting parts do not necessarily need to be activated in the same line of motion as the latches. Angled contact faces or surfaces 56 allow the contacting parts to be activated at an angle relative to the line or pathway of the traveling latches.

Figure 11:
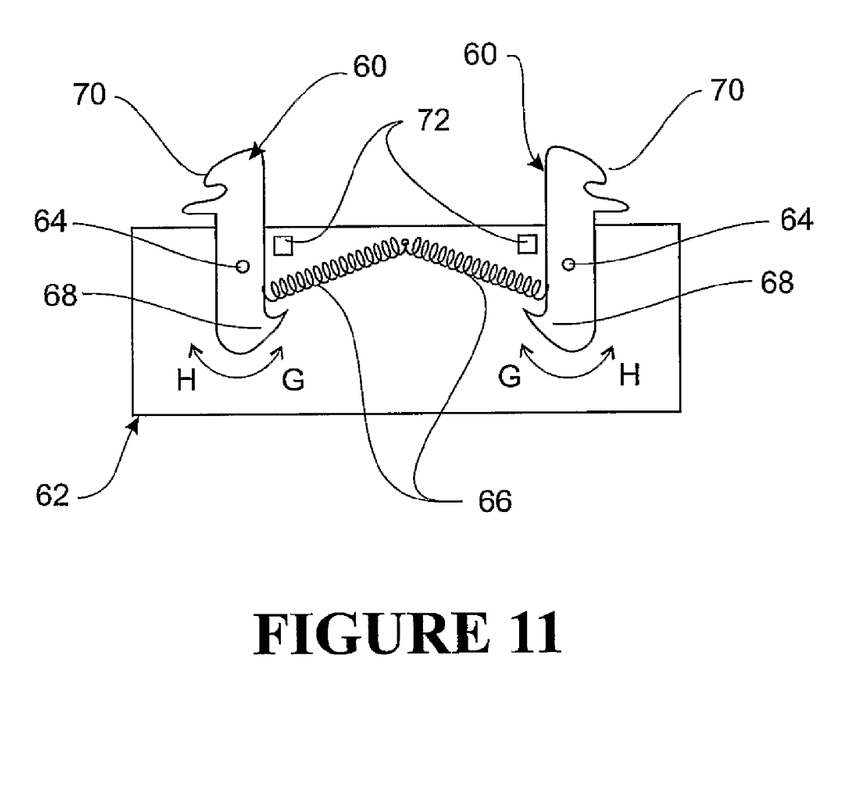
FIG. 11 is a schematic end view of a battery package having yet another alternative form of latching assembly.

Each of the various forms of the battery latching assembly described with reference to FIGS. 1-10 utilises slidably moveable latching members or latches that are biased. It will be appreciated that the latching members or latches could be mounted and movable in other ways. For example, each latching members 60 could be pivotally mounted to the housing of the battery package 62 at points 64 as shown in FIG. 11. In this alternative arrangement, biasing springs 66 or the like are coupled between the latching members 60 and the housing of the battery package 62 to urge them to rotate in direction G such that the latching portions 68 engage with respective catches on the radio or portable communication device to secure the battery package in place. As before, a user must squeeze or pinch contacting portions 70 of the latching members 60 toward each other, for example with a finger and thumb, to disengage the latching portions 68 from the catches of the radio to enable the battery package 62 to be released. In particular, the latching members 60 are arranged to rotate in direction H when squeezed by a user and this disengages the latching portions 68 from their respective catches to enable removal of the battery package 42 from the radio. Stopper protrusions 72 may also be provided on the housing of the battery package to bring the latching members 60 to rest when the battery package is removed from the radio.

In both the slidable and pivoting forms of the latching assembly, the latching members or latches are arranged and biased to automatically engage with respective catches on the radio as the battery package is brought together with the radio, thereby locking them together. To remove the battery package, the contacting portions of latching members or contacting parts that are operatively connected to the latches are squeezed or pinched together, in a slidable or pivotal manner, to disengage the latching portions from their respective catches to unlock the battery package from the radio. More particularly, the latching members or latches are biased toward a locked position in which their latching portions engage with respective catches on the radio and are operable to move into an unlocked position in which the latching portions disengage from their respective catches.

The foregoing description of the invention includes preferred forms thereof. Modifications may be made thereto without departing from the scope of the invention as defined by the accompanying claims.

The invention claimed is:

1. A portable communications device comprising:
a housing having a battery compartment that is defined between a front wall and a back wall, the front wall comprising a pair of opposed catches, each catch being located toward a side of the front wall and being arranged to protrude into the battery compartment; and a battery package that is releasably retained in the battery compartment, the battery package comprising:

a casing that is defined by front and rear faces and top and bottom ends between which left and right side extend, the top end of the casing being received at the front wall of the battery compartment of the housing and the bottom end of the casing being received at the back wall of the battery compartment;

a pair of opposed slidably moveable latching members being located at the top end of the casing and each toward a side of the casing, each latching member comprising an operable user contacting portion that is exposed at the front face of the casing and which is integrally formed with a latching portion that extends toward the rear face of the casing and which is arranged to engage with a respective catch of the battery compartment, the user contacting portion and latching portion being substantially aligned vertically with each other; and a biasing member or members that are arranged to urge the latching members to slide away from each other to cause their latching portions to engage with their respective catches of the battery compartment to thereby secure the battery package within the battery compartment and wherein the user contacting portions of the latching members are operable to cause their respective latching portions to slide toward each other to disengage from their respective catches to enable the battery package to be removed from the battery compartment.

2. A portable communications device according to claim 1 wherein the latching members of the battery package are arranged to sit in respective elongate guides provided toward the top end of the casing of the battery package, the latching members and guides cooperating to allow the latching members to slide toward and away from each other.

3. A portable communications device according to claim 1 wherein each latching member of the battery package has a side body that is arranged to move within a cavity centrally located toward the top end of the casing of the battery package as the latching members; slide toward and away from each other in operation.

4. A portable communications device latching assembly according to claim 3 wherein each latching member of the battery package has an associated biasing member that has first and second ends, the first end being securely received and retained by the side body of each latching member, while the second end is arranged to abut a surface within the cavity of the casing in which the side body moves.

5. A portable communications device according to claim 3 wherein the battery package comprises a single biasing member connected between the latching members via a single cavity, the biasing member having two ends that are securely received and retained by the respective side bodies of the latching members.

6. A portable communications device according to claim 1 wherein the user contacting portions of the latching members of the battery package are shaped to form finger undercuts to enable a user to grip and operate the user contacting portions to release the battery package from the portable communication device battery compartment.

7. A portable communications device according to claim 1 wherein the latching portions of the latching members of the battery package are shaped to engage with the catches in the front wall of the battery compartment of the housing in a locking relationship.

8. A portable communications device according to claim 7 wherein the latching portions of the latching members of the battery package are arranged to engage with the catches in the front wall of the battery compartment of the housing by hooking substantially under the catches.

9. A portable communications device according to claim 1 wherein each biasing member is a coiled spring.

10. A battery package that is releasably secured within a battery compartment of a portable communications device, the battery package comprising:

a casing that is defined by front and rear faces and top and bottom ends between which left and right sides extend;

a pair of opposed slidably moveable latching members being located at the top end of the casing and each toward a side of the casing, each latching member comprising an operable user contacting portion that is exposed at the front face of the casing and which is integrally formed with a latching portion that extends toward the rear face of the housing and which is arranged to engage with a catch of the battery compartment, the user contacting portion and latching portion being substantially aligned vertically with each other; and a biasing member or members that are arranged to urge the latching members to slide away from each other to cause their latching portions to engage with their respective catches of the battery compartment to thereby secure the battery package within the battery compartment and wherein the user contacting portions of the latching members are operable to cause their respective portions to slide toward each other to disengage from their respective catches to enable the battery package to be removed from the battery compartment.

11. A battery package according to claim 10 wherein the latching members are arranged to sit in elongate guides provided toward the top end of the casing, the latching members and guides cooperating to allow the latching members to slide toward and away from each other.

12. A battery package according to claim 10 wherein each latching member has a side body that is arranged to move within a cavity centrally located toward the top end of the casing as the latching members slide toward and away from each other in operation.

13. A battery package according to claim 12 wherein each latching member has an associated biasing member that has first and second ends, the first end being securely received and retained by the side body of each latching member, while the second end is arranged to abut a surface within the cavity of the casing in which the side body moves.

14. A battery package according to claim 10 wherein the user contacting portions of the latching members are shaped to form finger undercuts to enable a user to grip and operate the user contacting portions to release the battery package from the battery compartment of the portable communications device.

15. A removable battery package according to claim 10 wherein the latching portions of the latching members are shaped to engage with the catches of the battery compartment of the portable communications device in a locking relationship.

16. A removable battery package according to claim 15 wherein the latching portions of the latching members are arranged to engage with the catches of the battery compartment of the portable communications device by hooking substantially under the catches.

17. A battery package according to claim 10, further comprising a belt clip assembly that is provided on the front face of the casing toward the top end between the latching members.

18. A battery package according to claim 10, wherein the or each biasing member is fully concealed within the casing.

19. A battery package according to claim 12 wherein each biasing member is a coiled spring.

20. A portable communications device according to claim 1 wherein the back wall of the battery compartment of the housing comprises a pair of apertures each located toward a side of the back wall, and the bottom end of the casing of the battery package comprises two corresponding engagement protrusions, each protrusion located toward a side of the casing and being arranged to engage into a respective aperture of the back wall of the battery compartment to further secure the battery package within the battery compartment.

21. A portable communications device according to claim 1 wherein the battery package further comprises a belt clip assembly that is provided on the front face of the casing toward the top end between the latching members.

22. A portable communications device according to claim 1 wherein the or each biasing member is fully concealed within the casing of the battery package.

23. A portable communications device according to claim 1 in which the portable communications device is in the form of a portable two-way radio.

24. A portable communications device according to claim 1 wherein the catches of the battery compartment are elongate protrusions having a substantially triangular cross-sectional profile and being oriented such that the apex of the profile points upwardly from the battery compartment.

25. A portable communications device according to claim 5 wherein the biasing member is a coiled spring.

26. A battery package according to claim 12 wherein the battery package comprises a single biasing member connected between the latching members via a single cavity, the biasing member having two ends that are securely received and retained by the respective side bodies of the latching members.

27. A battery package according to claim 26 wherein the biasing member is a coiled spring.

\* \* \* \* \*